US011722215B1

(12) United States Patent
Bhaskar et al.

(10) Patent No.: US 11,722,215 B1
(45) Date of Patent: Aug. 8, 2023

(54) ACHIEVING HIGHER DATA RATE ON NB-IOT OVER SATELLITE

(71) Applicant: LOCKHEED MARTIN CORPORATION, Bethesda, MD (US)

(72) Inventors: Piya Seth Bhaskar, North Potomac, MD (US); Xiangdong Liu, Boyds, MD (US); Muthuthamby Sreetharan, Bethesda, MD (US); Dilip Shyamsundar Gokhale, Germantown, MD (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 39 days.

(21) Appl. No.: 17/035,566

(22) Filed: Sep. 28, 2020

(51) Int. Cl.
| | |
|---|---|
| *H04W 56/00* | (2009.01) |
| *H04B 7/185* | (2006.01) |
| *H04W 4/80* | (2018.01) |
| *H04L 1/00* | (2006.01) |
| *H04W 80/08* | (2009.01) |
| *H04W 80/02* | (2009.01) |
| *H04W 76/27* | (2018.01) |

(52) U.S. Cl.
CPC ..... *H04B 7/18576* (2013.01); *H04B 7/18539* (2013.01); *H04L 1/0003* (2013.01); *H04W 4/80* (2018.02); *H04W 76/27* (2018.02); *H04W 80/02* (2013.01); *H04W 80/08* (2013.01)

(58) Field of Classification Search
CPC . H04B 7/18576; H04B 7/18539; H04W 4/80; H04W 76/27; H04W 80/02; H04W 80/08; H04L 1/0003
USPC ........................................................ 370/316
See application file for complete search history.

(56) References Cited

U.S. PATENT DOCUMENTS

| | | | | |
|---|---|---|---|---|
| 2008/0108390 | A1* | 5/2008 | Yoon ...................... | H04B 7/086 |
| | | | | 455/561 |
| 2015/0017993 | A1* | 1/2015 | Ishii ....................... | H04W 36/22 |
| | | | | 455/444 |
| 2015/0092681 | A1* | 4/2015 | Fernando ............ | H04W 72/085 |
| | | | | 370/329 |
| 2019/0075438 | A1* | 3/2019 | Kuo ....................... | H04W 4/70 |
| 2019/0327707 | A1* | 10/2019 | Agnihotri ................ | G01S 5/10 |
| 2020/0314791 | A1* | 10/2020 | Akkarakaran ....... | H04W 12/037 |
| 2021/0037607 | A1* | 2/2021 | Hamidi-Sepehr ..... | H04W 76/27 |
| 2021/0083760 | A1* | 3/2021 | Schmidt .............. | H04B 7/18508 |
| 2021/0100023 | A1* | 4/2021 | Wei ....................... | H04W 72/14 |
| 2021/0175961 | A1* | 6/2021 | Liu ...................... | H04W 74/006 |
| 2021/0258201 | A1* | 8/2021 | Sengupta ............... | H04L 1/0025 |
| 2021/0351877 | A1* | 11/2021 | Xu ...................... | H04W 72/0446 |
| 2021/0377088 | A1* | 12/2021 | Gaal .................. | H04W 72/0453 |
| 2022/0015148 | A1* | 1/2022 | Sengupta ............ | H04W 74/006 |

(Continued)

*Primary Examiner* — Sai Ming Chan

(74) *Attorney, Agent, or Firm* — BakerHostetler

(57) ABSTRACT

A satellite communication system includes a satellite, satellite base station (eNodeB or gNodeB) and a user equipment (UE). The satellite provides a number of satellite beams, and each satellite beam includes multiple cells. The base station communicates with the UE via a satellite using a narrowband internet of things (NB-IoT) waveform and an enhanced protocol. In particular, the base station and UE perform carrier aggregation by adding and/or deleting carriers in a cell, and the base station and UE perform a (Continued)

higher-order modulation and coding scheme (MCS) processing to support high data rates for user data transport.

20 Claims, 10 Drawing Sheets

(56) References Cited

U.S. PATENT DOCUMENTS

2022/0038139 A1* 2/2022 Eriksson Löwenmark .................. H04B 7/01

* cited by examiner

*FIG. 8*

ACHIEVING HIGHER DATA RATE ON NB-IOT OVER SATELLITE

STATEMENT REGARDING FEDERALLY SPONSORED RESEARCH OR DEVELOPMENT

Not Applicable.

FIELD OF THE INVENTION

The present invention generally relates to satellite communication and, more particularly, to achieving higher data rate connectivity in narrowband- (NB-) internet of things (IoT) over satellite systems.

BACKGROUND

There is significant interest in using the fifth generation (5G) new radio (NR) as well as fourth-generation (4G) long-term evolution (LTE) physical layer over satellite links. Mobile satellite networks are increasingly assessing the use of NR and LTE as the air interface (radio-access technology) for next-generation systems. Using the newly standardized NR and widely deployed field-proven LTE physical layer, in conjunction with associated layer 2 and layer 3 radio-access technologies, can be very beneficial for satellite networks. NR and LTE technology provides several benefits, for example, seamless support for 5G/4G and/or 5G System (5GS)/evolved packet system (EPS)-based services, a range of standardized modulation and coding schemes, and standardized resource definitions (e.g., frequency and time) that are well suited for 5G/4G and/or EPS services.

Existing NR/LTE-over-satellite technology requires a minimum of 1.4 MHz of spectrum to be allocated in each satellite beam, and further requires a user terminal to have sufficient power and/or antenna performance to transmit with a bandwidth of at least 180 kHz. A number of service providers have expressed a great interest in NR/LTE-over-satellite deployments but with lower bandwidth carriers to support 1) operation with constrained overall available spectrum (e.g. less than 1.4 MHz per beam) and 2) lower-power user terminals. Currently, internet of things (IoT) services (e.g., asset tracking, meter reading, connected cars) are provided on narrower band carriers (e.g., 200 kHz) to support network connectivity to a large number of low-power, low-duty cycle, and low-cost devices.

The third-generation partnership project (3GPP) provides standardized narrowband IoT (NB-IoT) specifications as an extension to, and reuses much of, LTE technologies. 3GPP is also in the process of extending NB-IoT for non-terrestrial networks, including over-satellite deployment. NB-IoT operates on 200 kHz carriers and provides several UL bandwidths, such as 180, 90, 45, 15, and 3.75 kHz, for user terminals depending upon terminal capability and traffic needs. It should be noted that NB-IoT specifically targets services to a large number of low-power, low-duty cycle, and low-cost devices, and several NR/LTE capabilities are not supported over NB-IoT. For instance, these capabilities include user terminal mobility, resource-efficient voice service, and high data rate schemes such as high-order modulation (e.g., 16-ary and 64-ary), full duplex, and carrier aggregation.

SUMMARY

According to various aspects of the subject technology, methods and configuration for providing a narrowband internet of things (NB-IoT) over satellite are disclosed. The subject technology performs carrier aggregation (CA) to increase per-terminal data rate on NB-IoT over satellite systems. The subject disclosure further extends NB-IoT modulation and coding scheme (MCS) to include higher-order modulations, e.g., 16-ary and 64-ary modulations, to support higher data rates for user data transport.

In one or more aspects, a satellite communication system includes a satellite, satellite base station (eNodeB or gNodeB) and user equipment (UE). The satellite provides a number of satellite beams, and each satellite beam includes multiple cells. The base station communicates with the satellite via a feeder link, and the UE is in communication, via the satellite, with the base station using an NB-IoT protocol. The base station performs carrier aggregation by adding and/or deleting carriers in a cell, and the base station and UE perform a higher-order MCS processing to support high data rates for user data transport.

In other aspects, a method of configuring a satellite communication system includes configuring a satellite to support a number of satellite beams, with each satellite beam including multiple cells. The method also includes configuring a base station to communicate with the satellite and to perform carrier aggregation by adding and/or deleting carriers in a cell. The method further includes configuring a UE to communicate with the satellite and the base station using an NB-IoT protocol, and to perform a higher-order MCS processing to support high data rates for user data transport.

In yet other aspects, a satellite base station includes a processor that can control communications with a satellite and a UE using an NB-IoT protocol and perform carrier aggregation by adding and/or deleting carriers in a cell of a plurality of cells supported by a number of beams of the satellite. The processor can further cause transmission of a request for higher-order MCS to the UE.

The foregoing has outlined rather broadly the features of the present disclosure so that the following detailed description can be better understood. Additional features and advantages of the disclosure, which form the subject of the claims, will be described hereinafter.

BRIEF DESCRIPTION OF THE DRAWINGS

For a more complete understanding of the present disclosure and the advantages thereof, reference is now made to the following descriptions to be taken in conjunction with the accompanying drawings describing specific aspects of the disclosure, wherein:

FIG. 8 illustrates an example of tables demonstrating MCS enhancement for NB-IoT uplink, according to certain aspects of the disclosure.

DETAILED DESCRIPTION

Figure 1:
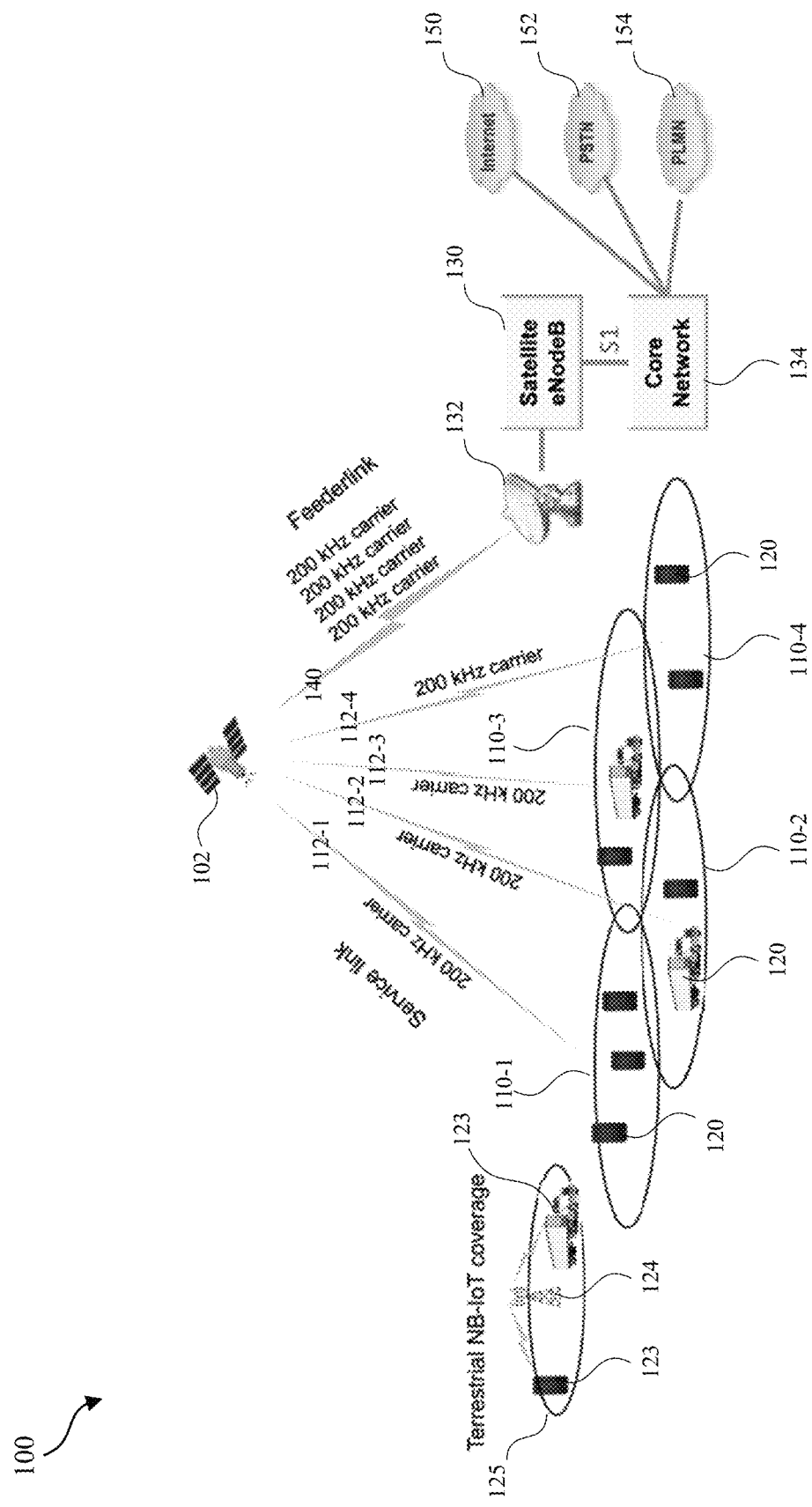
FIG. 1 is a high-level diagram illustrating example environments for deployment of a narrowband internet of things (NB-IoT) over-satellite system, according to certain aspects of the disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block-diagram form in order to avoid obscuring the concepts of the subject technology.

In some aspects of the present technology, methods and configuration are disclosed for providing a narrowband internet of things (NB-IoT) over-satellite technology. The subject technology is directed to performing carrier aggregation (CA) to increase per-terminal data rate on NB-IoT systems. The subject disclosure further allows extending NB-IoT modulation and coding scheme (MCS) to include higher-order modulations, e.g., 16-ary and 64-ary modulations to support higher data rates (e.g., tens of kbps up to several Mbps) for user data transport.

It is advantageous to reuse and retain as much as possible the terrestrial NB-IoT design in the disclosed NB-IoT-over-satellite technology, and to make modifications only when necessary for the satellite environment. Doing so allows maximal reuse of terrestrial NB-IoT equipment and product components and minimizes system development and deployment cost. The NB-IoT-over-satellite technology can be deployed together with fifth generation (5G) new radio (NR) and/or LTE-over-satellite technology to give a satellite operator the flexibility to use different-sized carriers compatible with available spectrum on a per-beam basis, and to provide a wide range of types of services to a wide range of terminal classes of different capabilities. As IoT development and deployment is picking up industrywide momentum, NB-IoT-over-satellite technology can be a pioneer in fourth-generation (4G) and fifth-generation (5G) over-satellite solutions for commercial as well as military applications. In the following, specific modifications to terrestrial NB-IoT to achieve the objects of this disclosure are further described.

In cellular technology and for frequency division duplexing (FDD), a cell is covered by two paired carriers, one DL and one uplink (UL), to provide bidirectional user services. For any given geographical location, multiple cells may be deployed to accommodate a high volume of traffic. With NB-IoT-over-satellite technology, multiple cells may be deployed in the same satellite beam.

The NB-IoT is based on 200 kHz carriers and other features that enable low-cost, low-power, and small-size user equipment (UE) with long battery life.

The 200 kHz NB-IoT carriers are also very well suited in providing general-purpose mobile-satellite services (MSS) in frequency-constrained systems. General-purpose MSS services does imply support for a variety of user devices and services, for example, in high data rate (e.g., devices). However, maximum data rate is limited within NB-IoT (~100 kbps in Release 14). It would be desirable to extend the NR/LTE-over-satellite technology to further include NB-IoT-over-satellite to provide 1) NR/LTE services (data and voice to potentially mobile users) on narrower band carriers at 200 kHz to be operable in a spectrum-limited environment, and 2) IoT services (asset tracking, meter reading, connected cars, etc.) to a large number of low-power, low-duty cycle, and low-cost devices. The disclosed technology details extensions to NB-IoT to include these CA and high-order (16-ary and 64-ary) modulation schemes, with the goal of achieving, for example, 1 Mbps on three NB-IoT carriers. These extensions, while focused on use in the satellite MSS networks, are also applicable to use in terrestrial 200 kHz NB-IoT networks.

The core elements of the subject solution include 1) adding and/or deleting carriers in a cell (geographic area) for carrier aggregation, 2) dynamically adding carriers to and/or deleting carriers from UEs, 3) treatment of multiple carriers on data stream, and 4) supporting an enhanced multicarrier semipersistent scheduling (SPS) algorithm.

The carrier aggregation is implemented to increase per-terminal data rate on the satellite NB-IoT system. The disclosed approach uses the anchor and non-anchor carrier mechanism and the radio-resource control (RRC) protocol connection set up about the carriers present in a cell, defined in the NB-IoT system, as described below. The anchor and non-anchor carriers are defined in the NB-IoT. In the DL, the anchor carrier carries control information such as narrowband reference signal (NRS), narrowband primary-synchronization signal (NPSS), network-switching subsystem signal (NSSS), narrowband physical broadcast channel (NPBCH), narrowband physical DL-shared channel (NPDSCH) and narrowband physical DL-control channel (NPDCCH). The non-anchor carrier carries NRS, NPDSCH and NPDCCH in the DL.

In the UL, the UL carrier carries NRS, NPRACH and narrowband physical UL-shared channel (NPUSCH) control information. In each cell, one anchor-carrier and several non-anchor carriers (up to 16) can be configured. The NPBCH/system information block (SIB) contains information about the anchor and/or non-anchor carriers allocated to the cell. The UE attaches to an NB-IoT system by first selecting a DL anchor carrier (thus a cell) and then selecting one of the carriers in the cell, anchor or non-anchor, to complete acquisition, and, if needed, attachment to the NB-IoT system. The UE stays with the acquired carrier, including during receiving page and resource assignment.

FIG. 1 is a high-level diagram illustrating an example environment 100 for deployment of an NB-IoT-over-satellite system, according to certain aspects of the disclosure. The environment 100 includes a space vehicle 102 (e.g., a satellite), UEs 120 (also referred to as terminal devices), a multicell satellite base station 130, a satellite antenna 132 (e.g., a reflector antenna, such as a dish antenna), and a core network 134, which is communicatively coupled to a number of networks such as the Internet 150, a public switched telephone network (PSTN) 152 and a public land mobile network (PLMN) 154. The UEs 120 are located within satellite cells 110 (110-1, 110-2, 110-3 and 110-4) and receive NB-IoT-over-satellite service from the satellite 102 via a number of NB-IoT communication channels 112 (112-1, 112-2, 112-3 and 112-4) (e.g., 200 kHz carrier channels). In some implementations, each satellite beam may have a number of cells (not shown in FIG. 1 for simplicity). Examples of the UEs 120 include hand-held, automotive, maritime or air-borne communication devices. Also shown in FIG. 1 is a terrestrial NB-IoT cell 125 including a terrestrial base station 124 and UEs 123, which receive terrestrial NB-IoT service from the terrestrial base station 124, and, when they move out of the coverage of the terrestrial base station 124, they receive services from the NB-IoT-over-satellite system, such as mobility, carrier aggregation, and full duplicity.

The satellite base station 130 is coupled to the satellite antenna 132 that communicates with the satellite 102 via a feederlink 140. In some aspects, the satellite base station 130 is a multicell (multibeam) base station and may include, among other components and modules, a communication processor. In some implementations, the communication processor is a specialized processor that is configured to perform one or more functionalities of the satellite base station 130 with respect to the subject disclosure. The feederlink 140 includes a number of 200 kHz carriers.

NB-IoT does not support carrier aggregation and hence the maximum bandwidth allocated to a UE is limited to the resource available on a single carrier of NB-IoT. This disclosure extends the use of LTE carrier-aggregation principles with resources allocated to UEs across multiple carriers (primary and secondary). The primary carrier may be the NB-IoT carrier used by the UE 120 to access the system or a carrier that the base station 130 commands the UE 120 to move to. The base station 130 may allocate resources on other NB-IoT carriers to the UE as needed, and these carriers will act as the secondary carriers to that UE. This allocation mechanism will support both ad hoc DL and UL resource allocations on the secondary carriers and semipersistent allocation on the DL and UL of the secondary carriers. This scheme increases the throughput for the UE 120 with resources across multiple carriers in both UL and DL.

For a satellite beam where high UE data rates are not needed, for example, where only low-rate voice and IoT services are supported, an NB-IoT anchor carrier and multiple non-anchor carriers can be deployed to reduce signaling overhead and to support a large number of UEs 120. A non-anchor carrier is a DL or UL carrier that does not include all the control channels and signals, such as NPSS, NPBCH, and SIBs, saving a minimum of 26% of time-frequency resources.

NB-IoT standards do not support handovers for connected users to maintain their existing connections. The present disclosure includes the use of intra-beam and inter-beam handover techniques to provide service continuity for connected mobile users. The technique involves measurement configuration provided to the UE 120 on the network access and feedback from the UE 120 on specially defined events indicating the result of measurements of the serving cell and the neighboring cells.

The base station 130 will provide special algorithms to process the events and make a decision on handover of the UE 120 from the current serving cell to a neighboring cell. The handover messaging will use the NR/LTE standard-defined RRC messages with extensions to allow for transfer of information to maintain the semipersistent resources allocated to the UE 120 on the current serving cell.

NB-IoT standard does not support voice over NR/LTE as a service. The subject disclosure extends the standard to support voice real-time transport protocol (RTP) packets with RLC unacknowledged mode (UM) as the radio-link protocol for transport of these voice packets. The UM provides segmentation and reassembly capabilities for the voice packet to be sent across multiple transport blocks but avoids the acknowledgement messaging and retransmission of packets, which are used in the acknowledged mode of operation.

NB-IoT does not provide mechanisms for prioritization of users accessing a cell. The present disclosure extends the use of access-barring mechanisms defined for standard NR/LTE cells to the NB-IoT. The base station 130 broadcasts access restrictions for various classes of users depending on system conditions. These access restrictions are sent over the system-information messages, and the UEs react to the access restrictions in the system-information messages by checking their class of service, and, if required, backing off from accessing the cell for a prescribed period.

Because the disclosed NB-IoT-over-satellite technology is a set of protocols and procedures extended from the (terrestrial) NB-IoT standard, a UE implementation can natively support both NB-IoT and NB-IoT-over-satellite. Such a UE can perform a prioritized scan of terrestrial NB-IoT DL carriers before searching for NB-IoT-over-satellite DL carriers. If a terrestrial NB-IoT carrier is present with sufficient quality, unless configured otherwise, the UE 120 will camp on the NB-IoT carrier and attempt to access the NB-IoT system. If the UE 120 is configured to not use the NB-IoT system, or an NB-IoT carrier is not present, the UE 120 will proceed to scan for an NB-IoT-over-satellite carrier.

Figure 2:
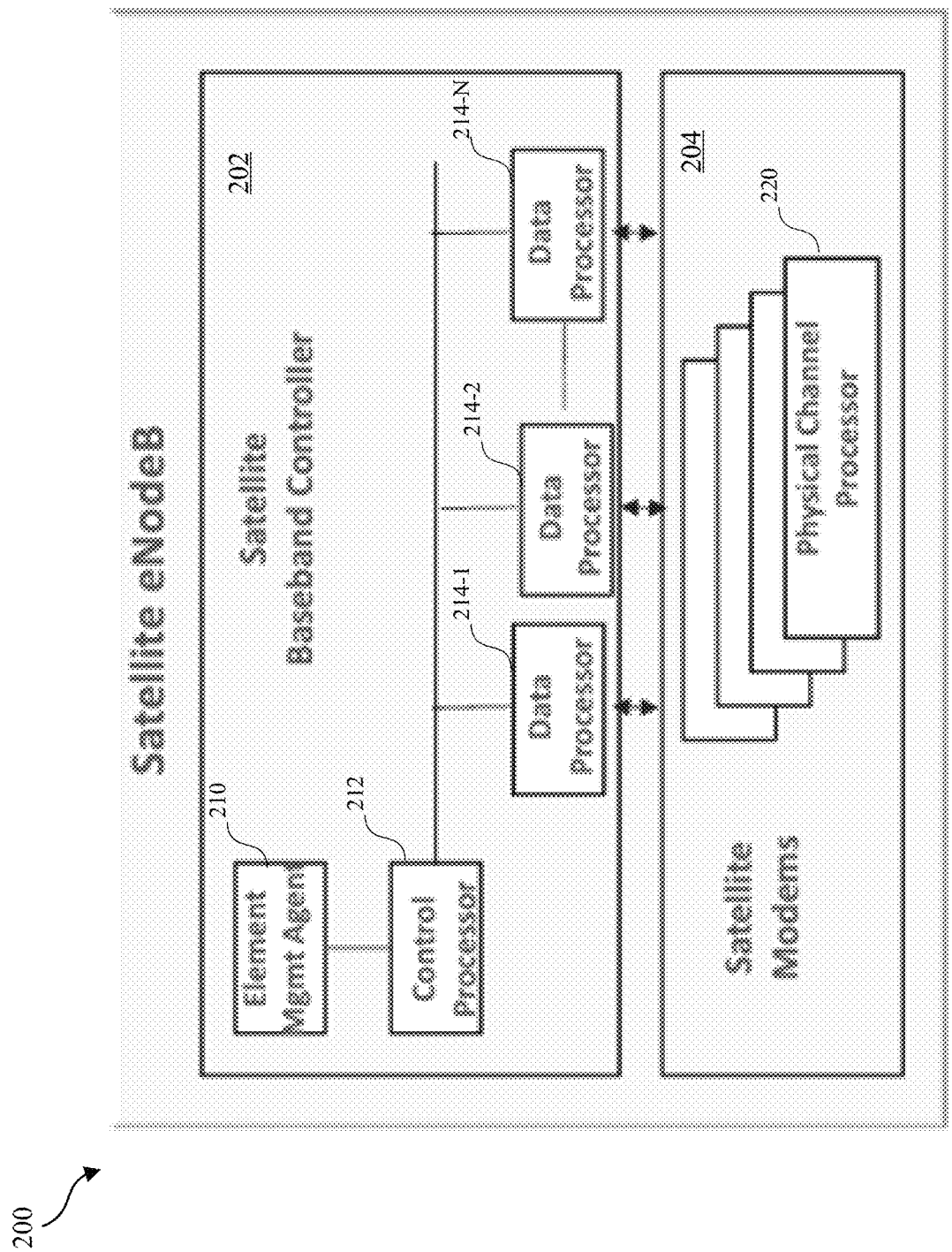
FIG. 2 is a high-level diagram illustrating an example architecture of a satellite base station of a satellite NB-IoT system, according to certain aspects of the disclosure.

FIG. 2 is a high-level diagram illustrating example architecture of a satellite base station 200 of a satellite NB-IoT system (a 4G eNB for illustration purposes), according to certain aspects of the disclosure. The satellite base station 200 includes a satellite baseband controller 202 and satellite modems 204. The satellite baseband controller 202 includes an element management agent 210 and a control processor 212. The element management agent 210 provides input to the control processor 212, which controls a number (N) of data processors 214 (214-1, 214-2, 214-N). The satellite modems 204 includes a number of physical channel processors 220. In an RRC-connection setup, the base station 200 determines the number of DL and/or UL carriers and their pairings to UEs (e.g., 120 of FIG. 1) for the UEs to be able to receive regular NB-IoT services. The element management agent 210 provides system configuration, monitoring and control features for elements in the satellite base station. The control processor 212 is the baseband master node that interfaces with and manages multiple data processor instances such as data processors 214. The data processors 214 are responsible for baseband processing of NB-IoT functions enhanced for satellite operation, radio resource management, RRC, packet data convergence protocol (PDCP), radio link control (RLC and media access control (MAC) layers. The physical channel processor 220 performs physical-layer processing functions to support satellite carriers, typically through an ARM processor and co-processors.

Figure 3:
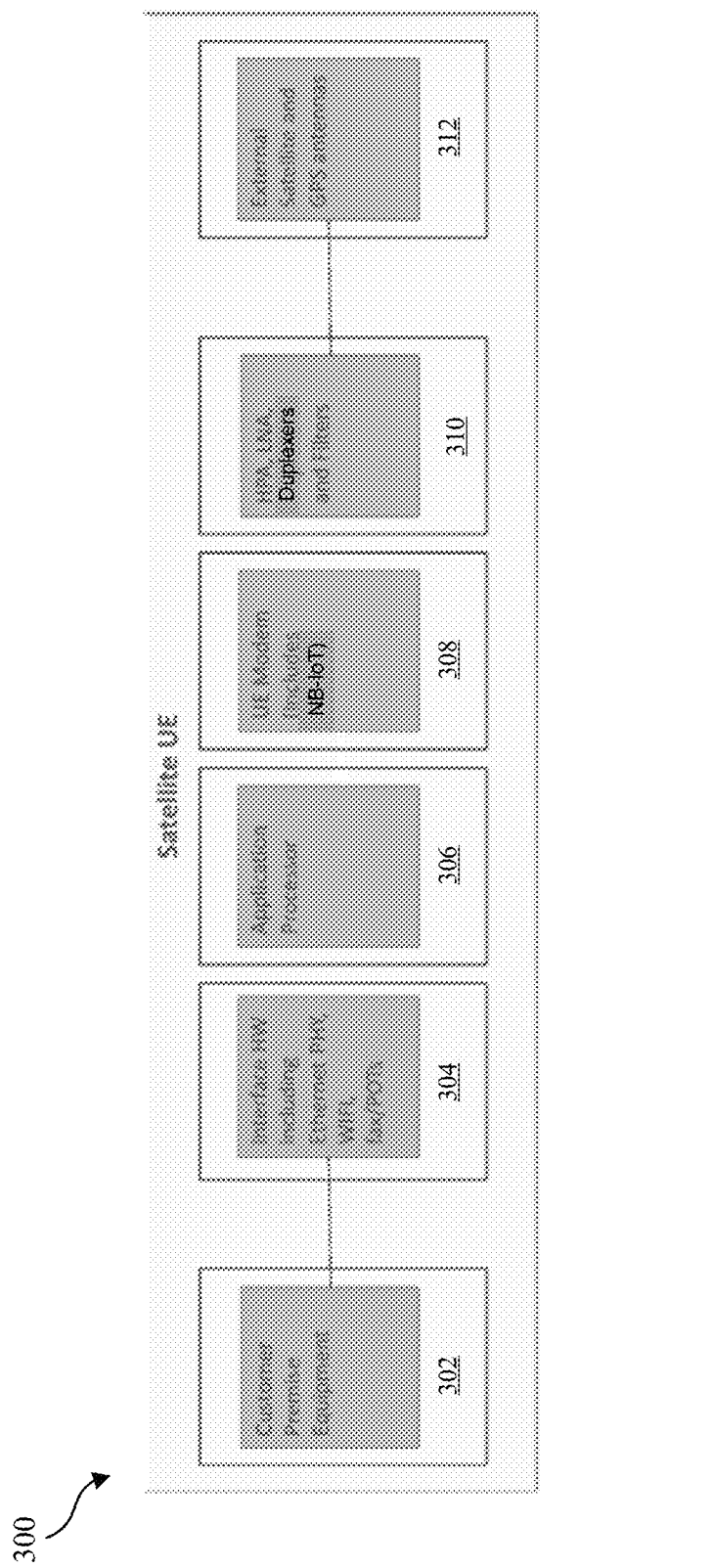
FIG. 3 is a high-level diagram illustrating an example architecture of satellite user equipment (UE), according to certain aspects of the disclosure.

FIG. 3 is a high-level diagram illustrating example architecture of a satellite UE 300, according to certain aspects of the disclosure. The satellite UE 300 includes a customer premise equipment 320, an interface hardware (HW) 304, an application processor 306, a UE modem 308 (including NB-IoT), a UE radio 310 (including high power amplifier (HPA), low-noise amplifier (LNA) duplexers and filters) and external satellite and GPS antennas 312. The customer premise equipment 320 may include public old telephone service (POTS) and/or smart phones, fax machines, Wi-Fi routers and one or more personal computers (e.g., laptops). The interface HW 304 provides support including Ethernet PHY to support router interfaces, Wi-Fi modems, and Fax machines and/or POTS interface HW. In a compact satellite UE, the customer premise equipment 320 and the interface HW 304 are combined into one functional block.

The application processor 306 contains an internal data router that provides the data plane interface to the modem processor, vocoder, GPS HW and operating system (OS) and/or middleware support. The UE modem 308 includes a signal-processing module for the PHY layer and baseband processing and contains interfaces to the RF receiver/transmitter hardware. The carrier aggregation of the subject disclosure takes place in UE modem 308. Further, the UE modem 308 is used to implement and control the disclosed higher-order MCS processing. The HPA is used to increase the transmission gain and the LNA enhances the receiver gain, both of which contain hardware interfaces to couple to the external antennas, such as one or more external static or tracking antennas, based on the UE configuration, and a GPS antenna.

In an RRC-connection setup on NB-IoT, the UE 300 performs the following steps: 1) scans to find NPSS and NSSS for frequency and time synchronization; 2) receives master information block (MIB) from the NPBCH on the anchor DL, where the MIB-NB contains information required to acquire system-information block 1 (SIB1) and SIB1-NB contains information to acquire other SIBs; 3) receives all SIBs on anchor DL. where SIB22 contains information about non-anchor UL and/or DL, 4) selects NPRACH resource (including selection of carrier) based on a random draw by using different carrier selection probabilities for anchor and non-anchor carriers; 5) sends RA on NPRACH on anchor and/or non-anchor UL and the corresponding DL; and 6) receives random-access response (RAR) and proceeds until the UE 300 is in an RRC-connected state. In the meantime, radio-resource management (RRM) of the base station 200 of FIG. 2 keeps track of each UE's primary UL and DL carrier after the RRC-connected state.

In one or more aspects of the subject technology, the carrier aggregation is performed by adding and/or deleting carriers in a cell. The base station (RRM) determines the number of DL and UL carriers to put up in a typical NB-IoT cell based on a number of considerations, such as the number of UEs in RRC-connected state, the number of UEs in RRC-idle state, the number of UEs that can potentially connect, the services and/or data rates expected to be served for the type of UEs, and specifics of UL and/or DL carriers that are to be broadcast for regular NB-IoT in SIB22, and other considerations. For carrier-aggregation purposes, RRM of the base station 200 needs to take additional factors into account, such as the potential number of UEs with the capability to aggregate carriers in cell, the number of UEs in RRC-connected state with the capability to aggregate carriers, services and/or data rates expected to be served for carrier aggregation, whether aggregation carriers are expected to be shared for with normal NB-IoT services, specifics of UL/DL carriers for carrier aggregation that are not to be broadcast for regular NB-IoT operation, and other factors.

In some aspects, the carriers assigned to the UE 300 for carrier aggregation are dynamically added and/or deleted in the following steps: 1) base station (RRM) activates and informs each UE 300 of the UL and DL carriers, that are to be used to support carrier aggregation (the UE selected carrier, anchor or non-anchor, is called the primary carrier); 2) the base station 200 sends an RRC UE-capability enquiry message to the UE; 3) the UE 300 responds with UE capability information with band-combinations parameter field, which defines the carrier aggregation capabilities supported by the UE 300 including interband non-contiguous, intraband non-contiguous or intraband contiguous aggregation capabilities; 4) the base station 200 keeps track of UEs 300 that can potentially support carrier aggregation; 5) when the base station 200 has increasing (larger) and/or decreasing (smaller) data to send to the UE 300, it assigns or removes additional carriers by the following procedure: a) the base station 200 sends an RRC-connection-reconfiguration message with selected DL and/or UL carriers; b) the base station 200 commands the UE 300 to a non-anchor carrier for aggregation purposes; and c) in response, the UE 300 sends an RRC-connection-reconfiguration-complete message on a selected carrier. At the end of the carrier-aggregation process, the UE 300 has more than one component carriers.

Figure 4:
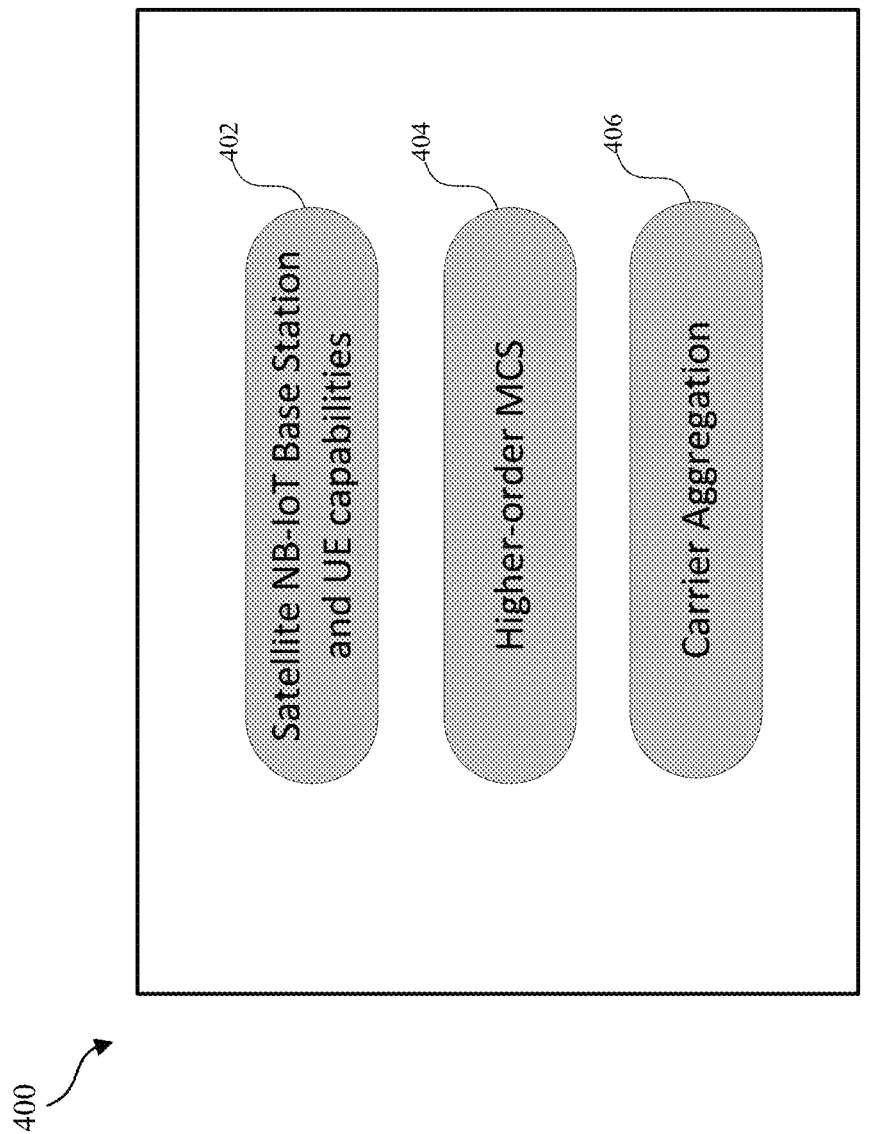
FIG. 4 is a functional block diagram illustrating examples of functional blocks of a base station and satellite terminal of a satellite NB-IoT system, according to certain aspects of the disclosure.

FIG. 4 is a functional block diagram illustrating examples of certain functional blocks 400 of an eNodeN and satellite terminal of a satellite NB-IoT system, according to certain aspects of the disclosure. The functional blocks 400 are implemented by software and/or firmware embedded in a base station satellite terminal (e.g., a UE 120 of FIG. 1 or 300 of FIG. 3) and executed by a local processor of the UE 120 of the satellite NB-IoT system 100 of FIG. 1 or a processor of the UE 300 such as the application processor 306 of FIG. 3. The functional blocks 400 implement the functionalities described above with respect to the satellite NB-IoT system 100 or related functionalities. The functional blocks 400 include the satellite NB-IoT modules consisting of a cell-selection module, an acquisition module, a SIB periodicity module, an NPRACH periodicity module, a no-HARQ retransmission module, full-duplex module, a semipersistent resource-allocation module, a mobility module, a voice with RLC-UM module, an access-barring module and an UL-frequency synchronization module and a dual-mode capability module that are modified modules from the legacy NB-IoT and are not shown for simplicity. The functional blocks 400 further include a second group of modules consisting of a satellite NB-IoT base station and UE capabilities module 402, a higher-order MCS module 404 and a carrier-aggregation module 406 that are the specific, new additions of the subject disclosure relative to standard NB-IoT.

The higher-order MCS module 404 is a new feature of the subject technology that starts transmission in the assigned MCS when assignment for 16-ary or 64-ary MCS is received. This can happen when (1) the UE is of a class that is capable of supporting a high data rate; (2) the UE is allocated multitone resources in UL; and (3) the link condition is sufficient in UL, then the request for 16-ary and 64-ary modulation (e.g., 16QAM or 16APSK and 64QAM or 64APSK) is transmitted.

The carrier-aggregation module 406 is an additional capability introduced by the subject disclosure to extend the use of carrier-aggregation principles with resources allocated to the UEs across multiple carriers (primary and secondary). The primary carrier is the NB-IoT carrier used by the UE to access the system, and the base station allocates resources on secondary NB-IoT carriers to the UE as needed. This allocation mechanism supports both ad hoc DL and UL resource allocations on secondary carriers and semipersistent allocation on the DL and UL of secondary carriers. This scheme increases the throughput for the UE with resources across multiple carriers in both UL and DL.

Figure 5:
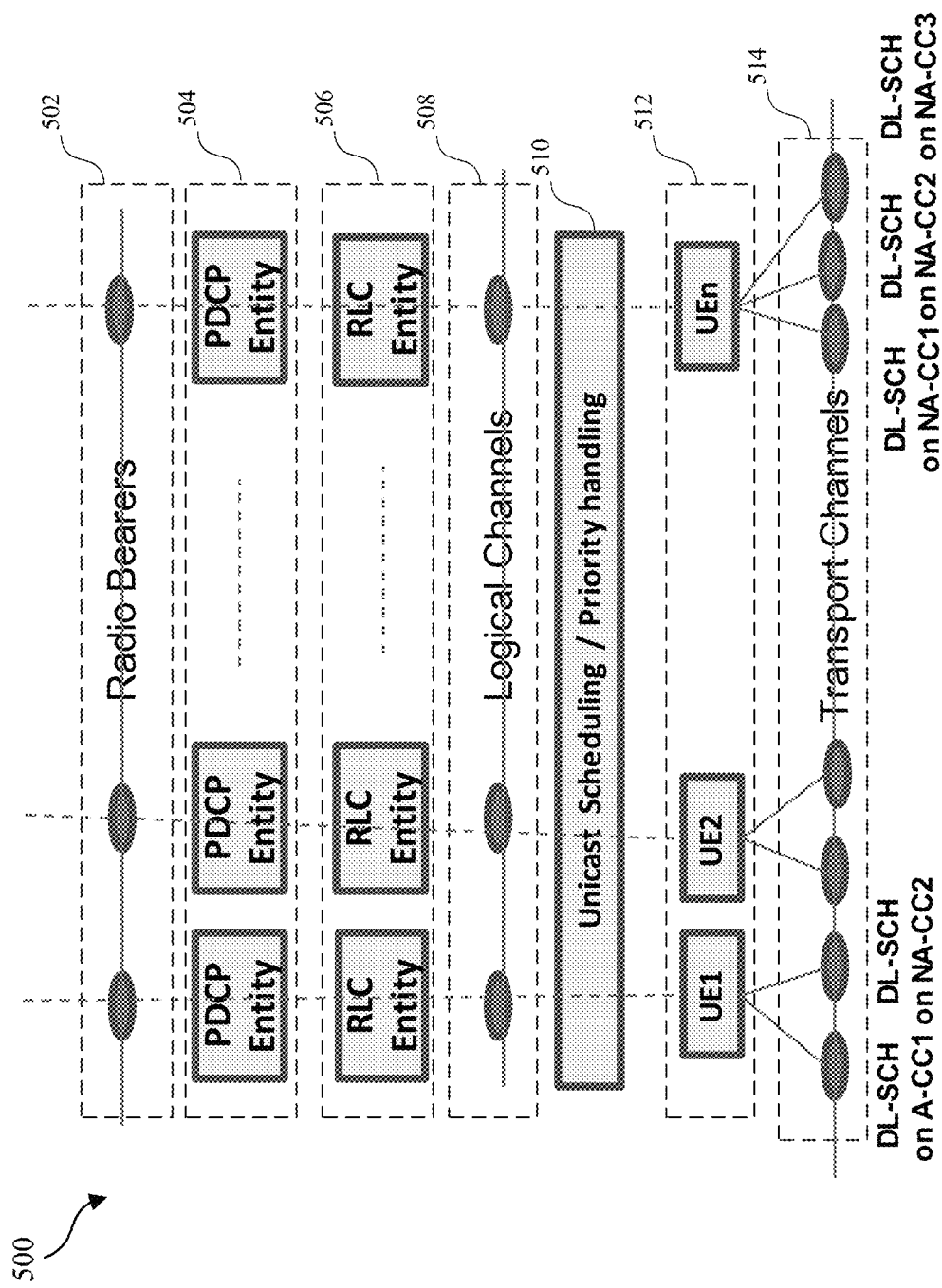
FIG. 5 is a functional block diagram illustrating an example implementation of carrier aggregation in a satellite NB-IoT system, according to certain aspects of the disclosure.

FIG. 5 is a functional block diagram illustrating an example implementation 500 of carrier aggregation in a satellite NB-IoT system, according to certain aspects of the disclosure. As discussed above, the carrier aggregation is implemented to increase per-terminal data rate on the satellite NB-IoT system (e.g., 100 of FIG. 1). The disclosed approach uses the anchor and/or non-anchor carrier mechanism and the RRC protocol connection set up about the carriers present in a cell, defined in the NB-IoT system. In the implementation 500, PDCP entities 504 and RLC entities 506, which are network layers between the radio bearers 502 and logical channels 508, are not aware of the carrier aggregation by the UEs 512 (UE1, UE2 . . . UEn). The unicast scheduling 510 is responsible for priority handling and unicast scheduling of data packets for UEs 512. Carrier aggregation is a responsibility of the MAC layer in each UE and does not involve the PDCP entities 504 and RLC entities 506. At the transport channel 514, the MAC layer assigns DL shared channel (DL-SCH) for each UE to different carriers. For example, at UE1, an anchor carrier 1 (A-CC1) and a non-anchor carrier 2 (NA-CC2) are assigned to two DL-SCH channels, and at UEn, NA-CC1, NA-CC2 and NA-CC3 carriers are assigned to three DL-SCH channels. The MAC layer (in UE and base station) makes the Multi-codeword (MCW) transmission, adaptive modulation and coding (AMC) on a per-carrier basis, and the base station monitors multiple channel-quality indicator (CQI) reports from carriers being aggregated.

Figure 6:
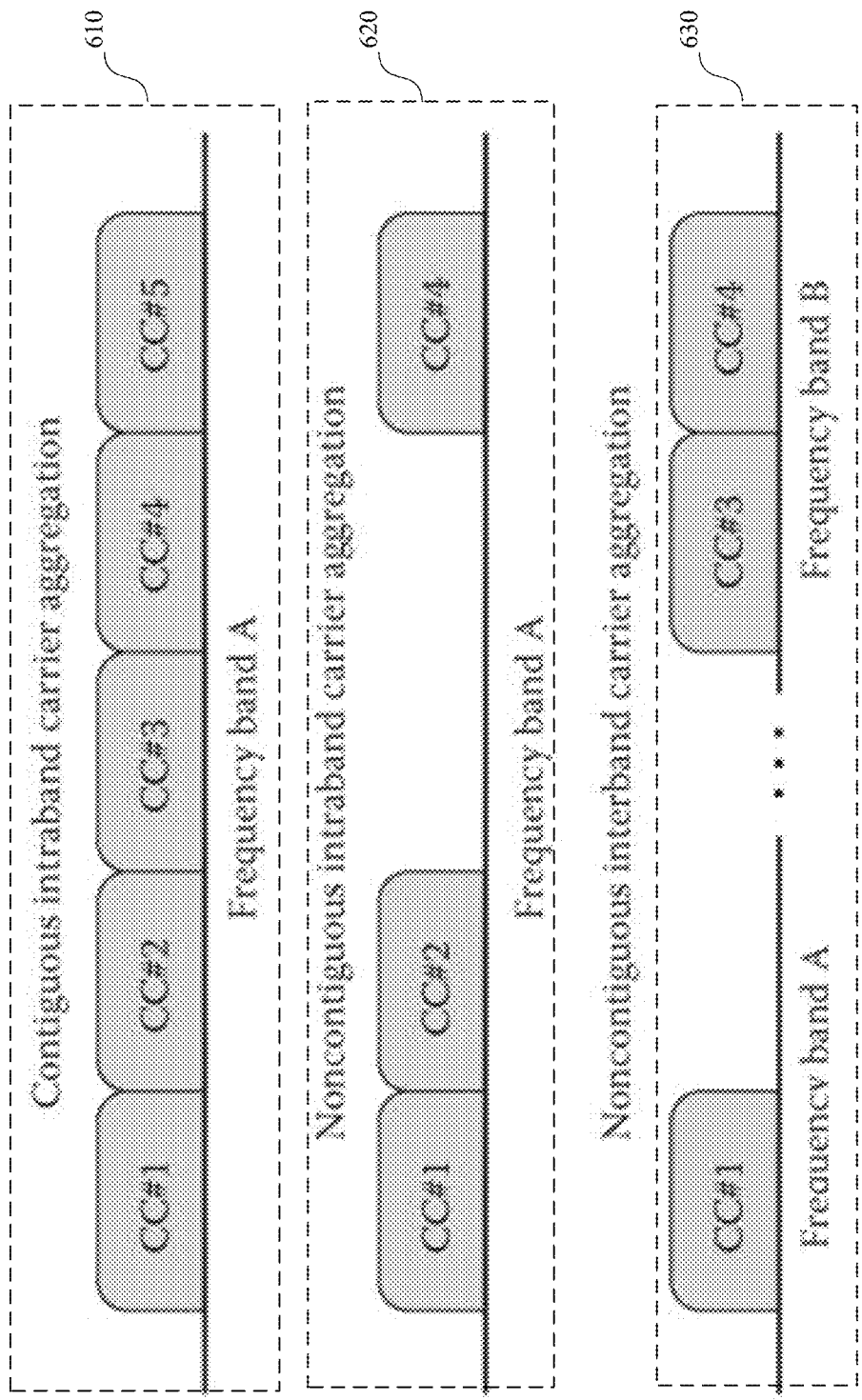
FIG. 6 is a block diagram illustrating examples of various modes of carrier aggregation in a satellite NB-IoT system, according to certain aspects of the disclosure.

FIG. 6 is a block diagram illustrating examples of various modes 600 of carrier aggregation in a satellite NB-IoT system, according to certain aspects of the disclosure. The different modes of carrier aggregations shown in FIG. 6 include a contiguous intraband carrier aggregation mode 610, a noncontiguous intraband carrier-aggregation mode 620 and a noncontiguous interband carrier aggregation mode 630. In the contiguous intraband carrier aggregation mode 610, multiple carriers (CC #1, CC #2, CC #3, CC #4, and CC #5) are aggregated in a single-frequency band A. In the noncontiguous intraband carrier-aggregation mode 620, multiple nonadjacent carriers or groups of carriers (CC #1, CC #2, and CC #4) are aggregated in a single-frequency band A. In the noncontiguous interband carrier-aggregation mode 630, multiple non adjacent carriers or groups of carriers are aggregated in different frequency bands. For example, CC #1 of the frequency band A and CC #3 and CC #4 of the frequency band B are aggregated.

When aggregated carriers are at different frequency bands, they have different propagation losses and different interfering systems, all of which affect achievable data rates, transmit power and usage of resources. Interband carrier aggregation provides more flexibility to utilize fragmented spectrum allocations. Satellite applications do not target interband carrier aggregation.

Support for enhanced multicarrier SPS can be provided for NB-IoT, DL SPS and common SPS. In a multicarrier environment, three possible options can be identified for implementation of the DL SPS. In the implementation, the primary carrier DL resource blocks (RBs) can be defined as SPS with a defined RB allocation and periodicity, while the secondary carriers can implement an ad hoc allocation as allocated when needed using traditional DL-control indicator-1 (DCI-1) control message. For the DL SPS configuration, the DL resource allocation in the primary and secondary carriers in the carrier aggregation set can be configured as SPS allocations with varying RB sizes or independent transmission-time intervals (TTIs), and also with different periodicity. This would be the most flexible DL resource allocations out of the three schemes. In the common SPS implementation, all carriers, primary and secondary, in a carrier aggregation set are configured with the same SPS resource definition (same TTI, same RB size and location, and periodicity). The selection of one of the above DL SPS configurations can depend on the dynamic nature of the DL traffic expected to be supported by the specific satellite communication system under consideration.

Figure 7:
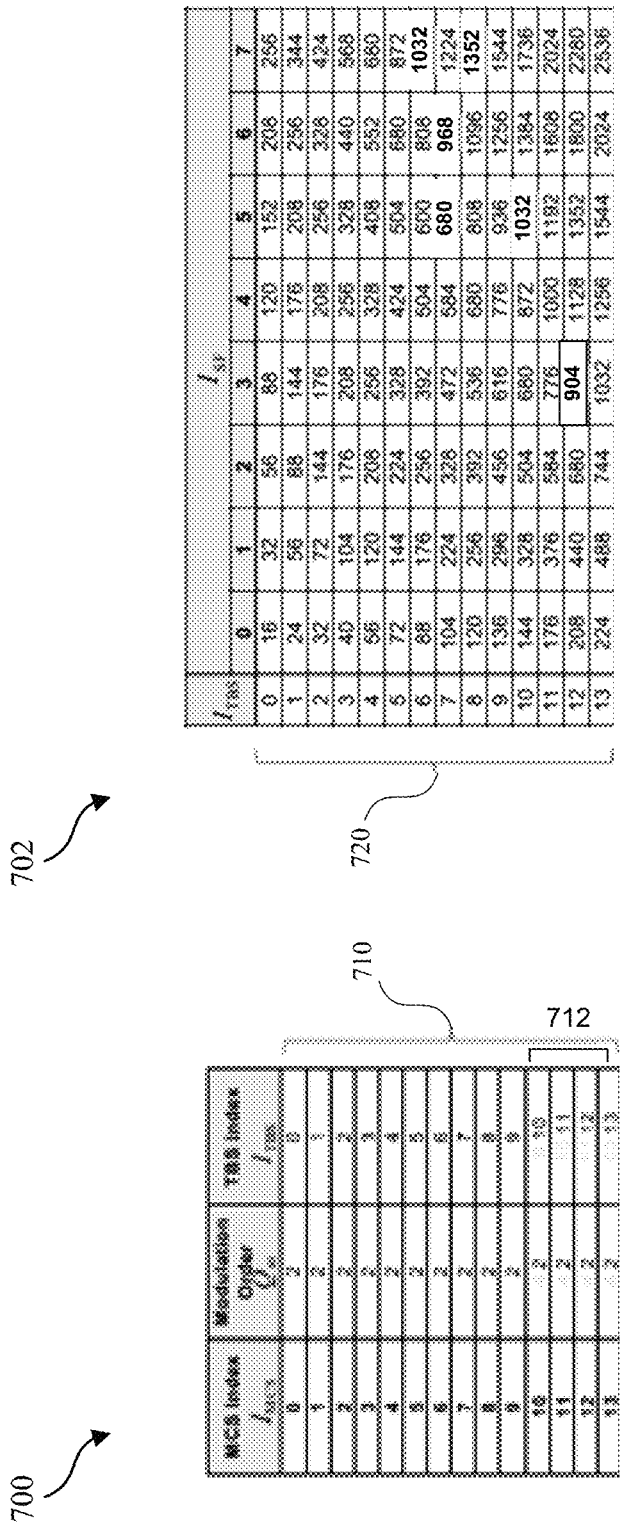
FIG. 7 illustrates an example of tables demonstrating modulation-and-coding scheme (MCS) enhancement for NB-IoT DL, according to certain aspects of the disclosure.

FIG. 7 illustrates examples of tables 700 and 702 demonstrating MCS enhancement for NB-IoT DL, according to certain aspects of the disclosure. As described above, NB-IoT MCS supports BPSK and QPSK MCS schemes. MCS in large part determines spectral efficiency and, over a fixed bandwidth, the data rate. The highest data rate is achieved when the transmission bandwidth is 180 kHz and modulation is QPSK. The disclosed technology extends NB-IoT MCS to include higher order modulations, such as 16-ary and 64-ary modulation schemes, to support higher data rates for user data transport. The DL transmission is at 180 kHz, and the UL transmission is a multitone transmission at n*15 KHz, where n can be 3, 6 and 12. The higher-order modulations are used for UEs with sufficient power and receive capability, and maximally reused definitions for LTE to maximize reuse of LTE implementation on the extended NB-IoT. The table 700 shows DL modulation order ($Q_m$) to transport block size index ($I_{TBS}$) mapping, where $Q_m$=2, 4, 6, respectively, mean modulation of QPSK, 16QAM, and 64QAM. $I_{TBS}$ in LTE reflects both modulation and code rate, for example, $I_{MCS}$=8 means QPSK modulation and $I_{TBS}$=8, in case of 1 PRB, 120 bits are coded. The tables 700 and 702 indicate NB-IoT DL enhancement and append the LTE TBS table to that of NB-IoT, matching $N_{PRB}$ to $I_{SF}$, and follow NB-IoT convention on TBS index such that $I_{TBS}$=$I_{MCS}$.

For the group of rows 710 of table 700 and 720 of table 702, NB-IoT to MCS mapping results in $I_{TBS}$=$I_{MCS}$. The group of four rows 712 is changed by the 3GPP from the LTE to NB-IoT. The group of seven rows 720 is added by the subject disclosure from LTE to NB-IoT-over satellite.

Figure 8:
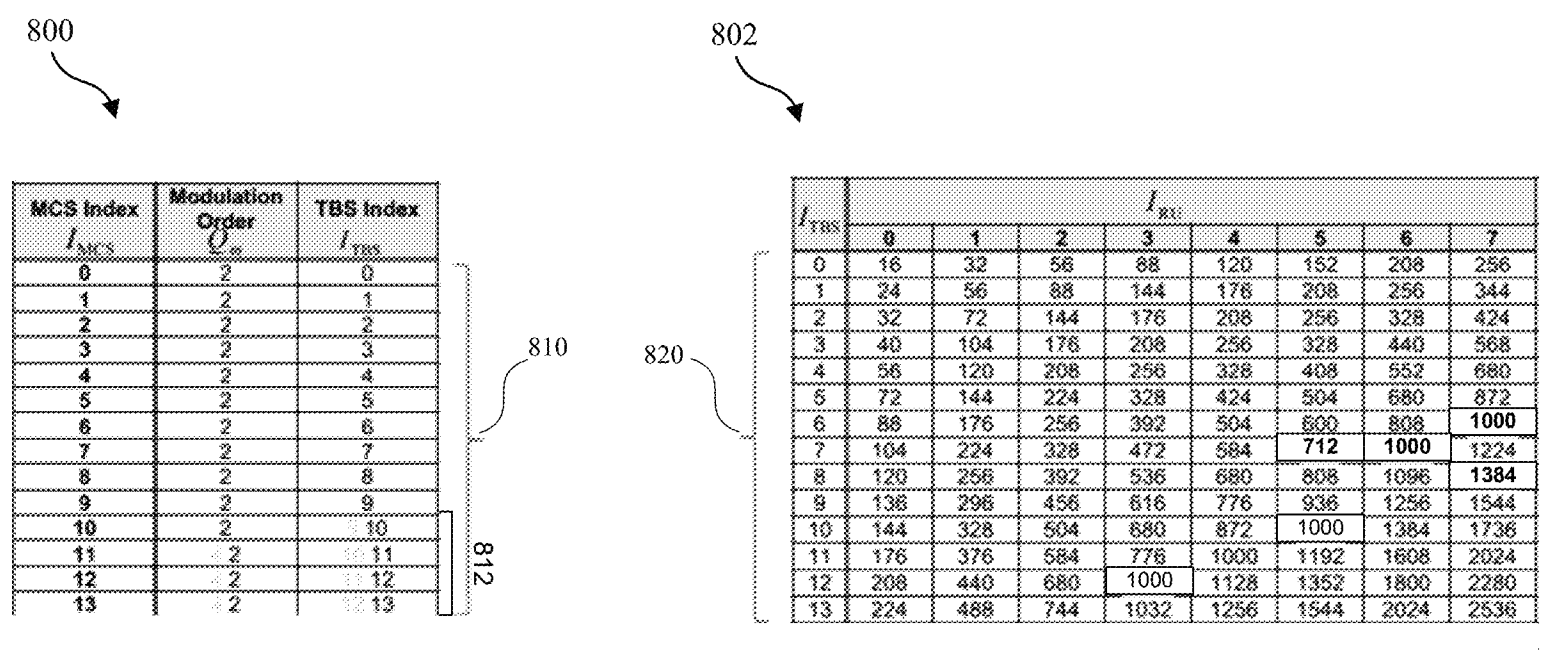

FIG. 8 illustrates examples of tables 800 and 802 demonstrating MCS enhancement for NB-IoT UL, according to certain aspects of the disclosure. The tables 800 and 802 indicate the NB-IoT UL enhancement and append the LTE TBS table to that of NB-IoT by matching $N_{PRB}$ to $I_{RU}$ and following NB-IoT convention on TBS index such that $I_{TBS}$=$I_{MCS}$. The table 800 shows DL modulation order ($Q_m$) to transport block size index ($I_{TBS}$) mapping, where $Q_m$=2, 4, 6, respectively, mean modulation of QPSK, 16QAM, and 64QAM schemes. $I_{TBS}$ reflects both modulation and code rate, for example, $I_{MCS}$=8 means QPSK modulation and $I_{TBS}$=8, in case of 1 PRB, 120 bits are coded. For the group of rows 810 of table 800 and 820 of table 802, NB-IoT to MCS mapping results in $I_{TBS}$=$I_{MCS}$. The group of four rows 812 are changed by the 3GPP from the LTE to NB-IoT. The group of seven rows 820 is added by the subject disclosure from LTE to NB-IoT over satellite.

For 16-ary and 64-ary modulation, instead of 16QAM and 64QAM as used in LTE, 16APSK and 64APSK are optionally used to potentially lower the power peak-to-average power ratio (PAPR) of the resulting OFDM signal, to achieve higher power efficiency at an amplifier, especially on a satellite. The subject disclosure describes a method to extend NB-IoT TBS to include 16-ary and 64-ary modulation orders by appending the NB-IoT TBS table with a portion of the LTE TBS table, as well as extending the (implicit) NB-IoT MCS to modulation and TB S mapping table with a portion of the modified LTE MCS to modulation and the TBS mapping table. MCS to TBS mapping follows that of NB-IoT and DL MCS to modulation order mapping is adjusted such that 16-ary modulation can achieve more than the 350 kbps data rate (for capable UEs) on a non-anchor carrier.

Figure 9:
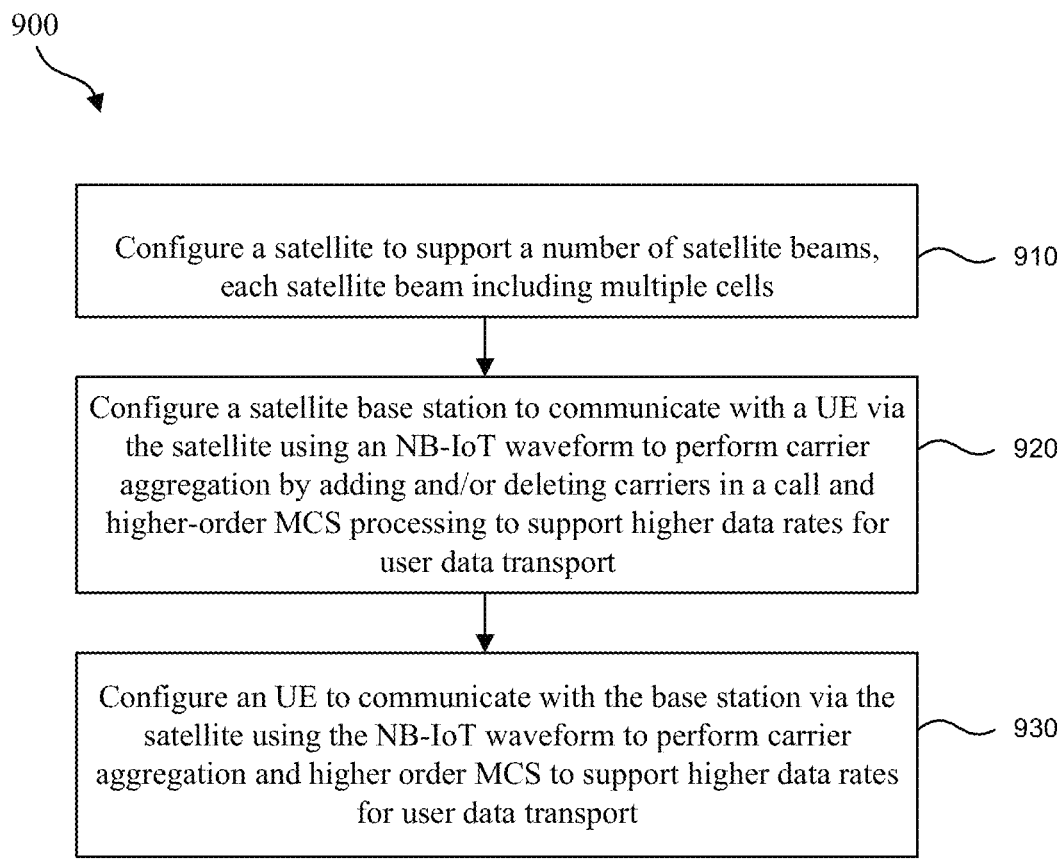
FIG. 9 is a flow diagram illustrating an example method of configuring a satellite NB-IoT system for carrier aggregation and higher-order MCS implementation, according to certain aspects of the disclosure.

FIG. 9 is a flow diagram illustrating an example method 900 of configuring a satellite NB-IoT system for carrier aggregation and higher order MCS implementation, according to certain aspects of the disclosure. The method 900 includes configuring a satellite (e.g., 102 of FIG. 1) to support a number of satellite beams, each satellite beam including multiple cells (e.g., 125 of FIG. 1) (1010). The method also includes configuring a base station (e.g., 130 of FIG. 1 and 200 of FIG. 2) to communicate with the satellite and to perform carrier aggregation by adding and/or deleting carriers in a cell (1020). The method further includes configuring a UE (e.g., 120 of FIGS. 1 and 300 of FIG. 3) to communicate with the satellite and the base station using an LTE protocol or an NB-IoT protocol, and to perform a higher-order MCS processing (e.g., as described with respect to FIGS. 7 and 8) to support high data rates for user data transport (1020).

Figure 10:
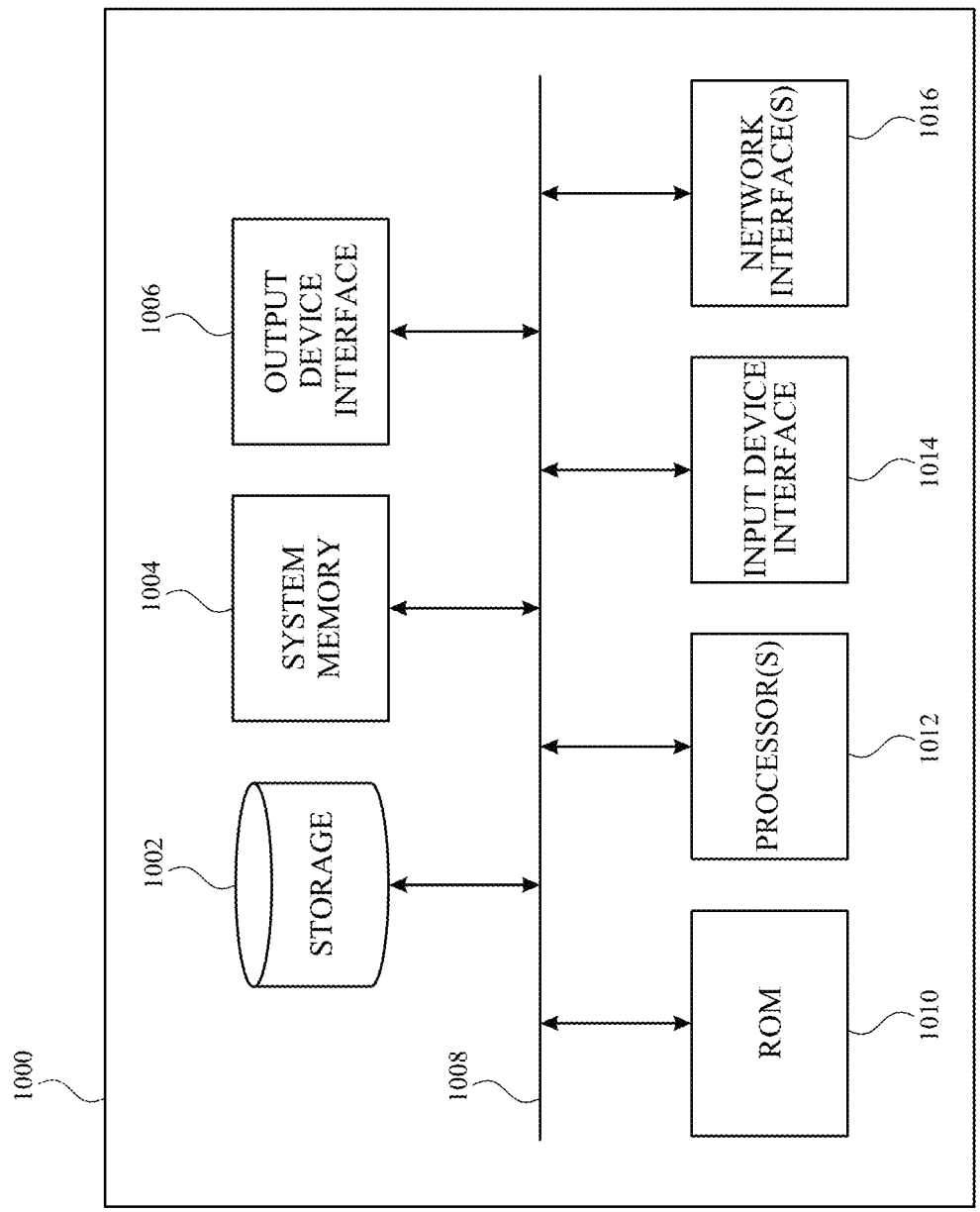
FIG. 10 conceptually illustrates an electronic system with which some aspects of the subject technology can be implemented.

FIG. 10 conceptually illustrates an electronic system with which some aspects of the subject technology can be implemented. The electronic system 1000, for example, can be a UE (e.g., UE 120 of FIG. 1), such as a phone, a personal digital assistant, a laptop computer, a tablet or a desktop computer, a base station (e.g., 130 or 124 of FIG. 1), a server, a switch, a router, a receiver, or any device that can control and/or perform processing of data including aggregation of data, or generally any electronic device that transmits signals over a network. Such an electronic system includes various types of computer-readable media and interfaces for various other types of computer-readable media. Electronic system 1000 includes bus 1008, Processor(s) 1012, system memory 1004, read-only memory (ROM) 1010, permanent storage device 1002, input device interface 1014, output device interface 1006, and network interface(s) 1016, or subsets and variations thereof.

Bus 1008 collectively represents all system, peripheral, and chipset buses that communicatively connect the numerous internal devices of electronic system 1000. In one or more implementations, bus 1008 communicatively connects Processor(s) 1012 with ROM 1010, system memory 1004, and permanent storage device 1002. From these various memory units, Processor (s) 1012 retrieve(s) instructions to execute and data to process in order to execute the processes of the subject disclosure. The Processor(s) 1012 can be a single processor or a multicore processor in different implementations.

ROM 1010 stores static data and instructions that are needed by Processor (s) 1012 and other modules of the electronic system. Permanent storage device 1002, on the other hand, is a read-and-write memory device. This device is a nonvolatile memory unit that stores instructions and data even when electronic system 1000 is off. One or more implementations of the subject disclosure use a mass-storage device (such as a magnetic or optical disk and its corresponding disk drive) as permanent storage device 1002.

Other implementations use a removable storage device (such as a floppy disk or flash drive, and its corresponding disk drive) as permanent storage device 1002. Like permanent storage device 1002, system memory 1004 is a read-and-write memory device. However, unlike storage device 1002, system memory 1004 is a volatile read-and-write memory, such as random access memory (RAM). System memory 1004 stores any of the instructions and data that Processor(s) 1012 need(s) at runtime. In one or more implementations, the processes of the subject disclosure, for example, the trained ROM, are stored in system memory 1004, permanent storage device 1002, and/or ROM 1010. From these various memory units, Processor(s) 1012 retrieve(s) instructions to execute and data to process in order to execute the processes of one or more implementations. In one or more implementations, the Processor (s) 1012 execute(s) the automatic processes of the subject technology, including executing functionalities of the functional blocks 400 of FIG. 4.

Bus 1008 also connects to input device interface 1014 and output device interface 1006. Input device interface 1014 enables a user to communicate information and select commands to the electronic system. Input devices used with input device interface 1014 include, for example, alphanumeric keyboards and pointing devices (also called "cursor-control devices"). Output device interface 1006 enables, for example, the display of images generated by electronic system 1000. Output devices used with output device interface 1006 include, for example, printers and display devices such as a liquid crystal display (LCD), a light-emitting diode (LED) display, an organic LED (OLED) display, a flexible display, a flat-panel display, a solid-state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback, and input from the user can be received in any form, including acoustic, speech, or tactile input.

Finally, as shown in FIG. 10, bus 1008 also couples electronic system 1000 to a network (not shown) through network interfaces 1016. In this manner, the computer can be a part of a network of computers (such as a local-area network (LAN), a wide-area network (WAN), or an Intranet, or a network of networks, such as the Internet). Any or all components of electronic system 1000 can be used in conjunction with the subject disclosure.

In some aspects, the subject technology is related to satellite communication and, more particularly, to an NB-IoT-over-satellite system. In some aspects, the subject technology may be used in various markets, including, for example, and without limitation, the signal-processing and communications markets.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks may be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single hardware and software product or packaged into multiple hardware and software products.

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

A reference to an element in the singular is not intended to mean "one and only one" unless specifically stated, but rather "one or more." The term "some" refers to one or more. All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the invention has been described with reference to the disclosed aspects, one having ordinary skill in the art will readily appreciate that these aspects are only illustrative of the invention. It should be understood that various modifications can be made without departing from the spirit of the invention. The particular aspects disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative aspects disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range are specifically disclosed. Also, the terms in the claims have their plain, ordinary meanings unless otherwise explicitly and clearly defined by the patentee. If there is any conflict in the usage of a word or term in this specification and one or more patent or other documents that may be incorporated herein by reference, the definition that is consistent with this specification should be adopted.

What is claimed is:

1. A communication system, comprising:
a satellite base station configured to communicate with a satellite, the satellite base station comprising:
a satellite baseband controller,
one or more satellite modems, and
a control processor operatively coupled to the satellite baseband controller and the one or more satellite modems, the control processor configured to:
provide a message to a plurality of terminal devices in communication with the satellite,
receive, based on the message, store a subset of the plurality of terminal devices that support carrier aggregation, and
responsive to data transfer increasing or decreasing from an initial data transfer to a terminal device of the subset of terminal devices, assigning or removing, respectively, carrier channels provided by the satellite.

2. The system of claim 1, wherein the control processor is further configured to, in response to the data transferring increasing or decreasing:
provide, to the terminal device, a reconfiguration message with selected downlink (DL) and/or uplink (UL) carriers
instruct, based on the reconfiguration message, the terminal device to a non-anchor carrier; and
receive, from the terminal device, a reconfiguration complete message.

3. The system of claim 1, wherein:
the control processor determines a number of the DL and/or UP carriers based on aggregation considerations, and
the aggregation considerations include an amount of UL and DL traffic to, a count of potential terminal devices with a capability to aggregate carriers of the cell and a count of terminal devices in a radio-resource control (RRC)-connected state with a capability to aggregate carriers, and data rates to be served for carrier aggregation.

4. The system of claim 1, wherein the control processor is further configured to activate and inform the terminal device the carrier aggregation.

5. The system of claim 1, wherein the control processor is further configured to transmit one or more RRC UE-capacity-enquiry messages to the terminal device.

6. The system of claim 1, wherein the control processor is further configured to a-capability-information message with a band-combinations-parameter field, which defines carrier aggregation capabilities supported by the terminal device including noncontiguous interband, noncontiguous intraband or contiguous intraband aggregation modes.

7. The system of claim 1, wherein the control processor is further configured to adjust a count of aggregated carriers based on an amount of data to be communicated to the terminal device.

8. The system of claim 1, the control processor is further configured to transmit an RRC-connection-reconfiguration message to the UE and to command the terminal device to use a non-anchor carrier.

9. The system of claim 1, the control processor is further configured to provide interband carrier aggregation that supports ad hoc DL and UL resource allocation and semi-persistent allocation.

10. The system of claim 1, wherein the satellite baseband controller is further configured to provide the terminal device with multiple component carriers.

11. The system of claim 1, wherein the control processer is further configured to perform multiplexing when sending out media access control (MAC) frames across component carriers assigned to the terminal device for carrier aggregation.

12. A communication system, comprising:
a satellite configured to provide a plurality of satellite beams, each satellite beam including a plurality of cells;
a satellite base station configured to communicate with a satellite, the satellite base station comprising:
a satellite narrowband (NB) Internet of Things (IoT) base station and user equipment (UE) capabilities module,
a carrier aggregation module, and
a control processor operatively coupled to the satellite NB-IoT and UE capabilities module and the carrier aggregation module, the control processor configured to:
provide a message to a terminal device in communication with a carrier of the satellite, and
responsive to data transfer increasing from an initial data transfer to the terminal device, allocate, using the carrier aggregation module, resources on a primary NB-IoT carrier, and
instruct the terminal device to move to the primary NB-IoT.

13. The system of claim 12, wherein the control processor is further configured to allocate a secondary NB-IoT carrier to the terminal device.

14. The system of claim 13, wherein a modulation and coding scheme (MCS) index is equal to a transport block size (TBS) index associated with transport blocks.

15. The system of claim 13, wherein the transport blocks have the same size as those in long-term evolution (LTE) for the TBS indices and matching number of subframes of NB-IoT to number of physical resource blocks (PRBs) in LTE.

16. The system of claim 13, wherein the control processor is further configured to schedule and transmit downlink transport blocks with higher-order MCS and larger block size for a UE when the UE is of a class supporting the higher-MCS and larger transport block size and when link condition supports the higher MCS.

17. The system of claim 13, wherein the control processor is further configured to schedule for higher-order MCS and larger block sizes in an uplink for a UE when the UE is of a class that is capable of supporting a 16-ary or 64-ary modulation.

18. The system of claim 17, wherein the control processor is further configured to:
perform carrier aggregation and higher-MCS and larger block size in downlink; and
perform carrier aggregation and higher-MCS and larger transport blocks in uplink.

19. The system of claim 13, wherein the control processor is further configured to, prior to causing transmission of the request for higher-order MCS, determine that the UE is capable of supporting a high data rate, that the UE is allocated multitone resources in UL and that a link condition is sufficient to support the high data rate in UL.

20. The system of claim 13, wherein:
the control processor is further configured to:
schedule and transmit downlink transport blocks with higher-order MCS and larger block size for a UE if the UE is of a class supporting the higher-MCS and larger transport block size when link condition supports the higher MCS, and
schedule for higher-order MCS and larger block sizes in an uplink for a UE when the UE is of a class that is capable of supporting the higher-MCS and larger block size and when a link condition is sufficient for higher MCS.

* * * * *